US012639788B2

(12) United States Patent
Shih et al.

(10) Patent No.: US 12,639,788 B2
(45) Date of Patent: May 26, 2026

(54) METHOD FOR RECONSTRUCTING IMAGES, ELECTRONIC DEVICE, AND STORAGE MEDIUM

(71) Applicant: Rayprus Technology (Foshan) Co., Ltd., Foshan (CN)

(72) Inventors: Cheng-Yuan Shih, New Taipei (TW); Hsiang-Chieh Yu, NewTaipei (TW)

(73) Assignee: Rayprus Technology (Foshan) Co., Ltd., Foshan (CN)

( * ) Notice: Subject to any disclaimer, the term of this patent is extended or adjusted under 35 U.S.C. 154(b) by 344 days.

(21) Appl. No.: 18/220,313

(22) Filed: Jul. 11, 2023

(65) Prior Publication Data

US 2024/0281929 A1 Aug. 22, 2024

(30) Foreign Application Priority Data

Feb. 20, 2023 (CN) .......................... 202310144251.6

(51) Int. Cl.
*G06T 5/73* (2024.01)
*G06T 5/20* (2006.01)
(52) U.S. Cl.
CPC .................. *G06T 5/20* (2013.01); *G06T 5/73* (2024.01); *G06T 2207/20081* (2013.01); *G06T 2207/20084* (2013.01)
(58) Field of Classification Search
CPC ... G06T 5/73; G06T 2207/20081; G06T 5/00; G06T 5/60; G01S 15/8977
See application file for complete search history.

(56) References Cited

U.S. PATENT DOCUMENTS

2021/0152734 A1* 5/2021 Zhou ...................... H04N 23/64

FOREIGN PATENT DOCUMENTS

| CN | 111080738 A | 4/2020 |
| CN | 111768462 | 10/2020 |
| CN | 114219742 A | 3/2022 |
| CN | 114820849 | 7/2022 |
| CN | 115565213 | 1/2023 |

(Continued)

OTHER PUBLICATIONS

Su L et al., "Defocused Image Restoration Using RBF Network and Iterative Wiener Filter in Wavelet Domain," 2008 Congress on Image and Signal Processing, Sanya, China, 2008, pp. 311-315, doi: 10.1109/CISP.2008.260. (Year: 2008).*

(Continued)

*Primary Examiner* — Amandeep Saini
*Assistant Examiner* — Jaspreet Kaur
(74) *Attorney, Agent, or Firm* — ScienBiziP, P.C.

(57) ABSTRACT

A method for reconstructing images, an electronic device and a storage medium is provided. In the method, the electronic device obtains an image to be reconstructed of an object captured by a target camera device, and obtains a sample image of the object. A radial basis function network is trained based on the image to be reconstructed and the sample image. An image reconstruction model is obtained by converting the radial basis function network based on a deconvolution algorithm, the image reconstruction model is configured for reconstructing images captured by the target camera device. By performing the method, a clarity of the image to be reconstructed can be improved.

20 Claims, 3 Drawing Sheets

(56) References Cited

FOREIGN PATENT DOCUMENTS

CN          115565213 A  *  1/2023

OTHER PUBLICATIONS

Han H et al. "Research on an online self-organizing radial basis function neural network". Neural Comput Appl. Jul. 2010;19(5):667-676. doi: 10.1007/s00521-009-0323-6. Epub Jan. 9, 2010. PMID: 20651904; PMCID: PMC2886091. (Year: 2010).*
GeeksforGeeks "Noise Models in Digital Image Processing", GeeksforGeeks, Nov. 22, 2022, www.geeksforgeeks.org/computer-vision/noise-models-in-digital-image-processing/. (Year: 2022).*
Yousif, Jabar & Hasoon, Feras & Alattar, Nebras & Ramli, Abd Rahman. (2011). Image Enhancement Using Nonlinear Filtering Based Neural Network. Journal of Computing ISSN 2151-9617,NY, USA. 3. 171-176. (Year: 2011).*
Ratnakar Dash et al, Motion blur parameters estimation for image restoration, Optik, Mar. 31, 2014, 1634-1640, 125-5.

* cited by examiner

METHOD FOR RECONSTRUCTING IMAGES, ELECTRONIC DEVICE, AND STORAGE MEDIUM

FIELD

The present application relates to a technical field of image processing, and more particularly to a method for reconstructing images, an electronic device, and a storage medium.

BACKGROUND

In order to improve a screen-to-body ratio of smartphones and provide a better experience for users, a design of an under-screen camera on the front of a smartphone becomes miniaturization. The under-screen camera is installed below a display screen, and a gap between light-emitting of a display area above a position corresponding to the under-screen camera rearranges a plurality of display pixels, it allows external light to be projected through the gap between the plurality of display pixels onto the under-screen camera. However, due to the small gap between the plurality of display pixels, the projected light onto the under-screen camera has diffraction, which causes point sources of light to spread out when projected onto the under-screen camera, resulting in degraded images captured by the under-screen camera, such as blurry images.

DETAILED DESCRIPTION

Figure 1:
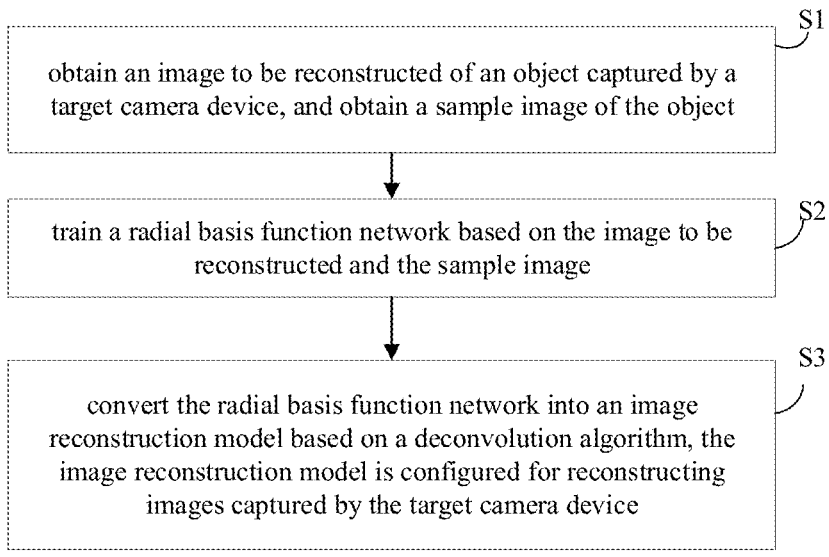
FIG. 1 is a flowchart diagram of a method for reconstructing images in an embodiment of the present disclosure.

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present application, however, the present application may also be implemented in other ways other than those described herein. The scope of the present application is not to be limited by the specific embodiments disclosed below. Unless defined otherwise, all technical and scientific terms used herein have the same meaning as commonly understood by one of ordinary skill in the art to which the present application belongs. The terms used herein in the present application are only for the purpose of describing specific embodiments and are not intended to limit the present application.

An electronic device 3 may include hardware such as, but is not limited to, a microprocessor and an Application Specific Integrated Circuit (ASIC), a Field-Programmable Gate Array (FPGA), a Digital Signal Processor (DSP), and embedded devices, for example.

The electronic device 3 may be any electronic equipment that can interact with a user, such as a personal computer, a tablet computer, a smart phone, a personal digital assistant (PDA), a game console, and an interactive network television, Internet Protocol Television (IPTV), or smart wearable devices, for example.

The electronic device 3 may also include a network device and/or a user device. The network device includes, but is not limited to, a single network server, a server group composed of multiple network servers, or a cloud including a large number of hosts or network servers based on a cloud computing technology.

A network can include, but is not limited to, the Internet, a wide area network (WAN), a metropolitan area network, a local area network, and a virtual private network (VPN), for example.

In one embodiment, in order to improve a screen-to-body ratio of smartphones and provide a better experience for users, a design of an under-screen camera on the front of a smartphone becomes miniaturization. The under-screen camera is installed below a display screen, and a gap between light-emitting of a display area above a position corresponding to the under-screen camera rearranges a plurality of display pixels, it allows external light to be projected through the gap between the plurality of display pixels onto the under-screen camera. However, due to the small gap between the plurality of display pixels, the projected light onto the under-screen camera has diffraction, which causes point sources of light to spread out when projected onto the under-screen camera, resulting in degraded images captured by the under-screen camera, such as blurry images.

In order to eliminate blurry images captured by an under-screen camera caused by light diffraction, it is necessary to reconstruct images captured by the under-screen camera. Although a method for directly constructing a large-scale processing network by using deep learning networks, may achieve good reconstruction effects, but this method is very time-consuming.

For the purpose of solving the above problems, a method for reconstructing images is provided in following embodiments. In an embodiment, an electronic device obtains an image to be reconstructed of an object captured by a target camera device, and obtains a sample image of the object. The electronic device trains a radial basis function network based on the image to be reconstructed and the sample image. Then, the electronic device converts the radial basis function network into an image reconstruction model based on a deconvolution algorithm, the image reconstruction model is configured for reconstructing images captured by the target camera device. The radial basis function network that can use a radial basis function and a loss function is trained to degrade the sample image without a screen into an image to be reconstructed that approaches a superimposed screen. By converting the radial basis function network into the image reconstruction model based on the deconvolution algorithm, and reconstructing a plurality of images captured by other target camera devices using the image reconstruction model, the image clarity and efficiency of the image to be reconstructed can be improved, and the cost of image reconstruction can also be reduced.

FIG. 1 is a flowchart diagram of a method for reconstructing images in an embodiment of the present disclosure. According to different requirements, an order of the steps in the flowchart can be adjusted based on actual requirements, and some steps can be omitted. The method can be performed by a electronic device, such as the electronic device 3 shown in FIG. 5.

In block S1, the electronic device obtains an image to be reconstructed of an object captured by a target camera device, and obtains a sample image of the object.

In one embodiment, the target camera device can be an Under-Display Camera (UDC), and the object can be any scene or object (e.g., a vehicle, a person, a tree, for example). The sample image represents a standard image of the object, such as a ground truth image, which can be captured using a high-resolution camera device.

Specifically, the image to be reconstructed and the sample image are images of a same object captured at a same angle and distance, the image to be reconstructed has a same size and a same dimension with the sample image.

In block S2, the electronic device trains a radial basis function network based on the image to be reconstructed and the sample image.

In one embodiment, due to convolution integral between an environment light source and a point spread function (PSF), the image to be reconstructed captured by the target camera device (such as an under-display camera) can be blurred. By simulating the PSF corresponding to the target camera device, a reconstruction of the image to be reconstructed can be achieved through an inverse transformation. Therefore, using the sample image as input data of the RBF network, and simulating the sample image of a convolution integral, an output result of the RBF network can approach the image to be reconstructed infinitely. A combination of neurons of the RBF network and weights approximate a point spread function model corresponding to the target camera device.

In one embodiment, the electronic device simulates point spread function models corresponding to the target camera device by invoking the radial basis function network. The radial basis function (RBF) network is a three-layer network structure that can project n-dimensional input data into an m-dimensional space, in which n and m are both positive integers that are greater than or equal to 1. Therefore, an image (such as the sample image) can be transformed into an n-dimensional vector, the n-dimensional vector corresponding to the image is used as input data of the RBF network, and an image corresponding to an m-dimensional vector is obtained. The RBF network is provided with an input layer, a hidden layer and an output layer. The input layer can be configured as an input end of the RBF network, the hidden layer takes a radial basis function as a base function, and is fully connected with the output layer of the RBF network. The output layer outputs an output result of the RBF network based on an accumulation function. The radial basis function includes a Gaussian radial basis function.

In one embodiment, the electronic device initializes a plurality of structural parameters and a loss function of the RBF network. The electronic device may randomly initialize the plurality of structural parameters and the loss function of the RBF network. The plurality of structural parameters may include, but are not limited to, connection weights between the hidden layer of the RBF network and neurons of the output layer. The loss function may include, but is not limited to, a second norm. The loss function indicates a difference between an output image of the RBF network and the image to be reconstructed. In response that the loss function converges to a preset value (e.g., 0.02) or a preset range (e.g., a range of [0.02, 0.03]), the electronic device determines that the output image has approached the image to be reconstructed infinitely closely.

Figure 2:
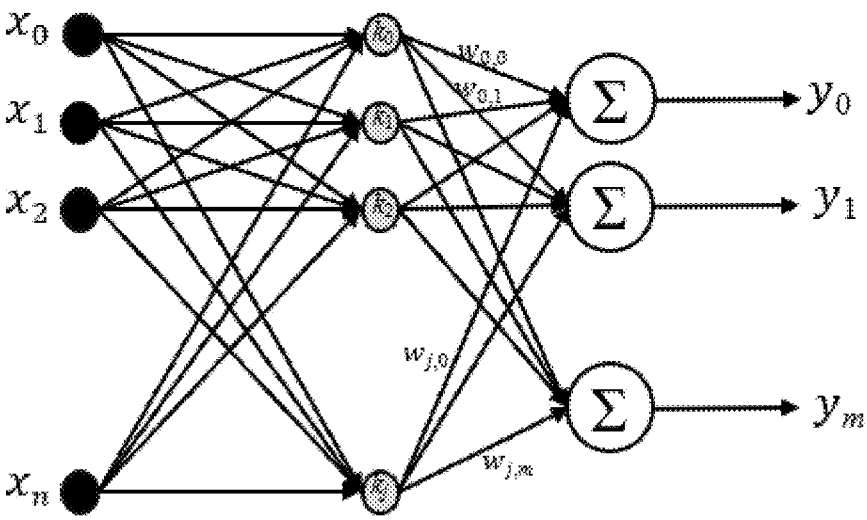
FIG. 2 is a first structural diagram of a radial basis function network in an embodiment of the present disclosure.

FIG. 2 is a first structural diagram of a radial basis function network in an embodiment of the present disclosure. As shown in FIG. 2, a plurality of black filled circles on the left side represent a plurality of neurons of the input layer, a plurality of gray filled circles in the middle represent a plurality of neurons $k_j$ of the hidden layer, and a plurality of filled circles on the right represent a plurality of neurons of the output layer. Each of the plurality of neurons in the hidden layer of the RBF network is connected to all neurons of the output layer on the right, the plurality of neurons have corresponding connection weights, such as a weight $w_{0.0}$ and $w_{0.1}$, $x=(x_1, x_2, \ldots, x_i, \ldots x_n)$ represents an input data, $y=(y_1, y_2, \ldots, y_v, \ldots, y_m)$ represents an output result. Based on the Gaussian radial basis function, a formula of $$y_v = \sum_{p=0}^{j} w_{i,p} e^{\frac{\|x_i - \mu_p\|}{2\sigma^2}}$$

can be obtained, i, j, v, m, n in the formula are positive integers that are greater than or equal to 1. $\mu_p$ represents a $p^{th}$ center point of the Gaussian radial basis function, and $\sigma$ represents a standard deviation of $x_i$. The plurality of structural parameters further includes a value of the center point.

Figure 3:
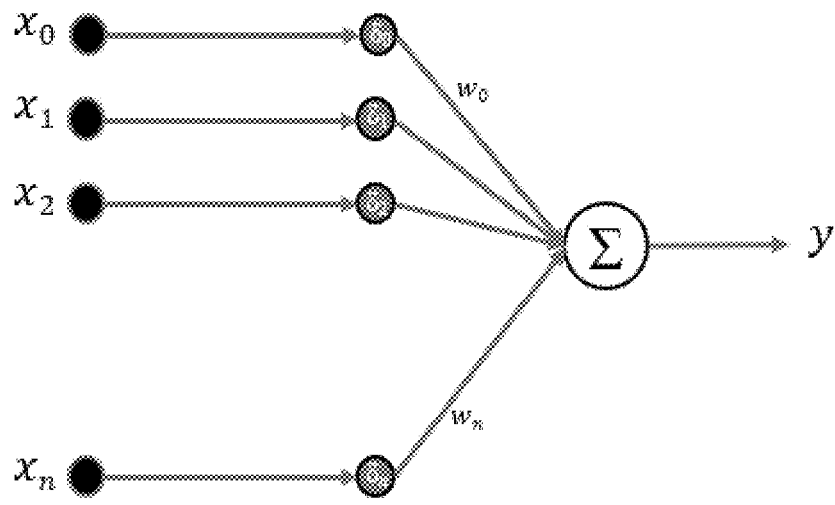
FIG. 3 is a second structural diagram of the radial basis function network in an embodiment of the present disclosure.

FIG. 3 is a second structural diagram of a radial basis function network in an embodiment of the present disclosure. Compared with FIG. 2, the structural diagram of a radial basis function network in FIG. 3 is a simplified example, in which $\delta_n$ represents the $n^{th}$ neuron of the hidden layer, and the Gaussian radial basis function corresponding to each of the plurality of neurons of the hidden layer is simplified to a Gaussian pulse function.

In one embodiment, the electronic device optimizes the plurality of structural parameters until the loss function corresponding to an output result of the radial basis function network converges to a preset value by using the sample image as input data of the radial basis function network.

In one embodiment, as a random initialization method is performed for initializing the plurality of structural parameters and the loss function of the RBF network, an expected convergence of the loss function cannot be guaranteed by initializing the radial basis function network. Therefore, an optimization of the RBF network is necessary, and the electronic device optimizes the RBF network using an optimization algorithm that provides with a gradient descent algorithm.

Specifically, referring to a weight $w=(w_1, w_2, \ldots, w_i, \ldots w_n)$ in FIG. 3, the second norm loss function can be represented as: $L(x,w)=(y-y')^2=(y-\Sigma_i w_i x_i)^2$, the gradient descent algorithm can be represented as:

$$\Delta w_i = \frac{\partial L}{\partial w} = -2x_i \left( y - \sum_i w_i x_i \right).$$

Iterative update of the weight using the gradient descent algorithm for the optimization can be represented as: $w_{i,t+1}=w_{i,t}-\eta\Delta w_i$, in which $w_{i,t}$ represents a weight obtained after the $t^{th}$ iteration update, t is a positive integer that is greater than or equal to 1, and $\eta$ represents a learning rate of the gradient descent algorithm.

In one embodiment, the loss function is converged continuously using the gradient descent algorithm, until the loss function reaches the preset value or the present range, and a corresponding expected RBF network is obtained.

In block S3, the electronic device converts the radial basis function network into an image reconstruction model based on a deconvolution algorithm, the image reconstruction model is configured for reconstructing images captured by the target camera device.

In one embodiment, the electronic device obtains a point spread function of the image to be reconstructed by simulating degradation of the sample image using the RBF network. To reconstruct other images, the other images need to be deconvolved, and the radial basis function network is converted into the image reconstruction model.

In one embodiment, the deconvolution algorithm provides with a wiener deconvolution algorithm. The wiener deconvolution algorithm may be a non-blind linear image restoration algorithm. Specifically, the electronic device determines a transformation relationship y between a clear sample image x and a blurred image to be reconstructed as $y = x \otimes h + Q$, in which h represents a blurred kernel and Q represents noise, and $\otimes$ represents a convolution. A principle of the wiener deconvolution algorithm involves using a wiener filter G to minimize the difference between $G \otimes y$ and x.

In one example, since specific effects of the blurred kernel and noise have been learned from the RBF network in block S2, a non-blind wiener deconvolution algorithm can be directly applied to the RBF network, and the image reconstruction model is obtained. Commonly used technique in the field can be adopted, it is not described detailedly here.

In one example, the electronic device trains the RBF network and the image reconstruction model using the sample image and the image to be reconstructed, thus, the training cost and the computational complexity can be reduced, and the RBF network and the image reconstruction model can be directly integrated into the target camera device, such as a smartphone with an under-screen camera. In response that a user captures an image with the under-screen camera, a reconstructed image can be quickly obtained for previewing.

Figure 4:
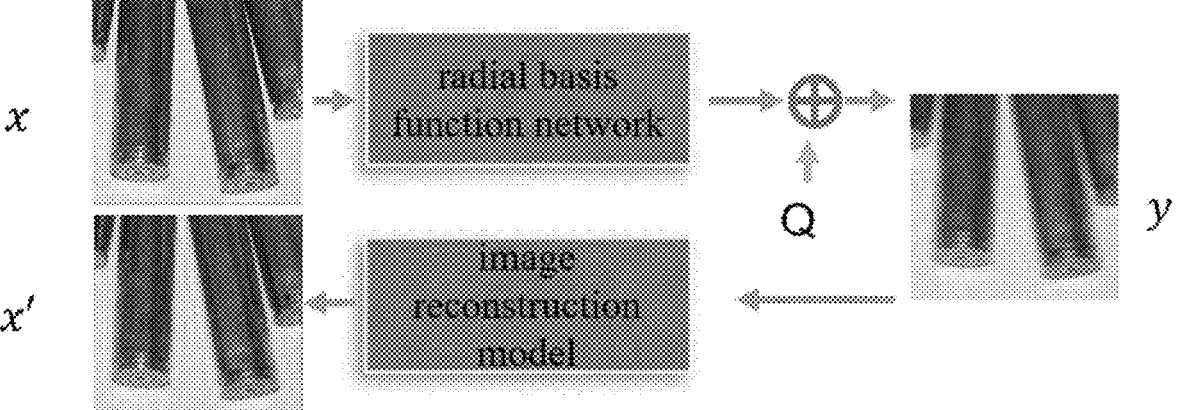
FIG. 4 is an example diagram of the method for reconstructing images in an embodiment of the present disclosure.

FIG. 4 is an example diagram of the method for reconstructing images in an embodiment of the present disclosure. As shown in FIG. 4, x represents a high-definition sample image, y represents a blurred image to be reconstructed, and x' represents an image which improved clarity of the blurred image to be reconstructed. It can be seen that the method for reconstructing images in the embodiment of the present application reduces a blurring degree of the blurred image to be reconstructed and improves its clarity.

In the above embodiments, the radial basis function network that can use a radial basis function and a loss function is trained to degrade the sample image without a screen into an image to be reconstructed that approaches a superimposed screen. By converting the radial basis function network into the image reconstruction model based on the deconvolution algorithm, and reconstructing a plurality of images captured by other target camera devices using the image reconstruction model, the image clarity and efficiency of reconstructing the image can be improved, and the cost of image reconstruction can also be reduced.

Figure 5:
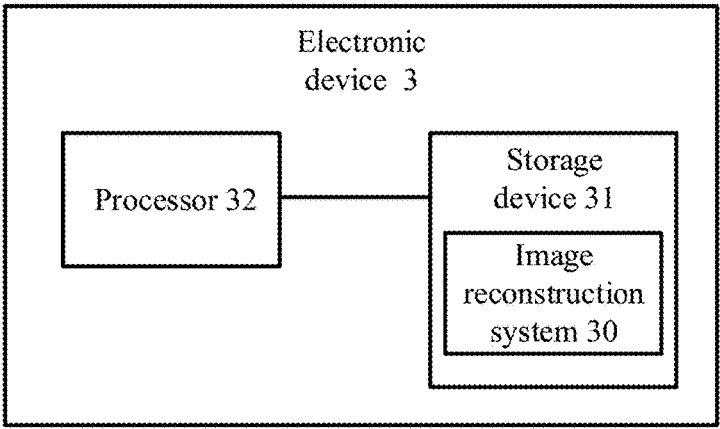
FIG. 5 is a structural diagram of an electronic device in an embodiment of the present disclosure.

FIG. 5 is a structural diagram of an electronic device in an embodiment of the present disclosure.

The electronic device 3 may include a storage device 31, and at least one processor 32. Computer-readable instructions are stored in the storage device 31 and executable by the at least one processor 32.

FIG. 5 shows an example of the electronic device 3, and it is not limited. Another electronic device 3 may include more or fewer components than shown in the figures or may combine some components or have different components. For example, the electronic device 3 may further include an input/output device, a network access device, a bus, and the like.

The at least one processor 32 can be a central processing unit (CPU), or can be other general-purpose processor, digital signal processor (DSPs), application-specific integrated circuit (ASIC), Field-Programmable Gate Array (FPGA), another programmable logic device, discrete gate, transistor logic device, or discrete hardware component, etc. The processor 32 can be a microprocessor or any conventional processor. The processor 32 is a control center of the electronic device 3 and connects various parts of the entire electronic device 3 by using various interfaces and lines.

The processor 32 executes the computer-readable instructions to implement a method for reconstructing images, such as in block S1-S13 shown in FIG. 1.

For example, the computer-readable instructions can be divided into one or more modules/units, and the one or more modules/units are stored in the storage device 31 and executed by the at least one processor 32. The one or more modules/units can be a series of computer-readable instruction segments capable of performing specific functions, and the instruction segments are used to describe execution processes of the computer-readable instructions in the electronic device 3.

The storage device 31 stores the computer-readable instructions and/or modules/units. The processor 32 may run or execute the computer-readable instructions and/or modules/units stored in the storage device 31 and may call up data stored in the storage device 31 to implement various functions of the electronic device 3. The storage device 31 mainly includes a program storage area and a data storage area. The storage area for programs may store an operating system, and an application program required for at least one function (such as a sound playback function, an image playback function, for example), for example. The storage area for data may store data (such as audio data, phone book data, for example) created during the use of the electronic device 3. In addition, the storage device 31 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

The storage device 31 may be an external memory and/or an internal memory of the electronic device 3. The storage device 31 may be a memory in a physical form, such as a memory stick, or a Trans-flash Card (TF card), for example.

When the modules/units integrated into the electronic device 3 are implemented in the form of independent software functional units, they can be stored in a non-transitory readable storage medium. Based on this understanding, all or some of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

With reference to FIG. 1, the storage device 31 in the electronic device 3 stores a plurality of instructions to implement a method for reconstructing images, for example, the storage device 31 may be used to store a image reconstruction system 30 installed in the electronic device 3. The processor 32 can execute the multiple instructions to: obtain an image to be reconstructed of an object captured by a target camera device, and obtain a sample image of the object; train a radial basis function network based on the image to be reconstructed and the sample image; and convert the radial basis function network into an image reconstruction model based on a deconvolution algorithm, the image reconstruction model is configured for reconstructing images captured by the target camera device.

The image reconstruction system 30 may include a plurality of functional modules composed of the computer-readable instructions. The computer-readable instructions are executed by the processor 32 to realize the functions of each module/unit in the above-mentioned device embodiments, which will not be repeated here.

In the several embodiments provided in the preset embodiment, the disclosed electronic device and method can be implemented in other ways. For example, the embodiments of the devices described above are merely illustrative. For example, a division of the modules is based on logical function only, and there can be other manners of division in actual implementation.

In addition, each functional module in each embodiment of the present disclosure can be integrated into one processing module, or can be physically present separately in each unit, or two or more modules can be integrated into one module. The above modules can be implemented in a form of hardware or in a form of a software functional unit.

Therefore, the present embodiments are considered as illustrative and not restrictive, and the scope of the present disclosure is defined by the appended claims. All changes and variations in the meaning and scope of equivalent elements are included in the present disclosure. Any reference sign in the claims should not be construed as limiting the claim.

Moreover, the word "comprising" does not exclude other units nor does the singular exclude the plural. A plurality of units or devices stated in the system claims may also be implemented by one unit or device through software or hardware. Words such as "first" and "second" are used to indicate names, not a particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for reconstructing images using an electronic device, comprising:

obtaining an image to be reconstructed of an object captured by a target camera device, and obtaining a sample image of the object, a resolution of the sample image being higher than a resolution of the image to be reconstructed;

training a radial basis function network based on the image to be reconstructed and the sample image, comprising: using the sample image as input data of the radial basis function network, and simulating a convolution integral on the sample image, to make an output result of the radial basis function network approaches the image to be reconstructed; and converting the radial basis function network into an image reconstruction model based on a deconvolution algorithm, the image reconstruction model being configured for reconstructing images captured by the target camera device.

2. The method for reconstructing images of claim 1, wherein the radial basis function network comprises:

an input layer, which is configured as an input end of the radial basis function network;

a hidden layer, which takes a radial basis function as a base function, and is fully connected with an output layer of the radial basis function network; and the output layer, which outputs an output result of the radial basis function network based on an accumulation function.

3. The method for reconstructing images of claim 1, wherein training the radial basis function network based on the image to be reconstructed and the sample image further comprises:

initializing a plurality of structural parameters and a loss function of the radial basis function network.

4. The method for reconstructing images of claim 3, wherein training the radial basis function network based on the image to be reconstructed and the sample image further comprises:

optimizing the plurality of structural parameters until the loss function corresponding to an output result of the radial basis function network converges to a preset value by using the sample image as input data of the radial basis function network.

5. The method for reconstructing images of claim 3, wherein the loss function is provided with a second norm.

6. The method for reconstructing images of claim 3, further comprising:

optimizing the radial basis function network using an optimization algorithm provided with a gradient descent algorithm.

7. The method for reconstructing images of claim 1, further comprising:

simulating point spread function models corresponding to the target camera device by invoking the radial basis function network.

8. The method for reconstructing images of claim 1, wherein the deconvolution algorithm is provided with a wiener deconvolution algorithm.

9. A electronic device comprising:

a processor; and a storage device storing a plurality of instructions, which when executed by the processor, cause the processor to:

obtain an image to be reconstructed of an object captured by a target camera device, and obtain a sample image of the object, a resolution of the sample image being higher than a resolution of the image to be reconstructed;

train a radial basis function network based on the image to be reconstructed and the sample image, comprising: use the sample image as input data of the radial basis function network, and simulate a convolution integral on the sample image, to make an output result of the radial basis function network approaches the image to be reconstructed; and convert the radial basis function network into an image reconstruction model based on a deconvolution algorithm, the image reconstruction model being configured for reconstructing images captured by the target camera device.

10. The electronic device of claim 9, wherein the radial basis function network comprises:

an input layer, which is configured as an input end of the radial basis function network;

a hidden layer, which takes a radial basis function as a base function, and is fully connected with an output layer of the radial basis function network; and the output layer, which outputs an output result of the radial basis function network based on an accumulation function.

11. The electronic device of claim 9, wherein the processor is further caused to:

initialize a plurality of structural parameters and a loss function of the radial basis function network.

12. The electronic device of claim 11, wherein the processor is further caused to:

optimize the plurality of structural parameters until the loss function corresponding to an output result of the radial basis function network converges to a preset value by using the sample image as input data of the radial basis function network.

13. The electronic device of claim 11, wherein the processor is further caused to:

optimize the radial basis function network using an optimization algorithm provided with a gradient descent algorithm.

14. The electronic device of claim 9, wherein the processor is further caused to:

simulate point spread function models corresponding to the target camera device by invoking the radial basis function network.

15. A non-transitory storage medium having stored thereon at least one computer-readable instructions, which when executed by a processor of an electronic device, causes the processor to perform a method for reconstructing images, the method comprising:

obtaining an image to be reconstructed of an object captured by a target camera device, and obtaining a sample image of the object, a resolution of the sample image being higher than a resolution of the image to be reconstructed;

training a radial basis function network based on the image to be reconstructed and the sample image, comprising: using the sample image as input data of the radial basis function network, and simulating a convolution integral on the sample image, to make an output result of the radial basis function network approaches the image to be reconstructed; and converting the radial basis function network into an image reconstruction model based on a deconvolution algorithm, the image reconstruction model is configured for reconstructing images captured by the target camera device.

16. The non-transitory storage medium of claim 15, wherein the radial basis function network is provided with:

an input layer, which is configured as an input end of the radial basis function network;

a hidden layer, which takes a radial basis function as a base function, and is fully connected with an output layer of the radial basis function network; and the output layer, which outputs an output result of the radial basis function network based on an accumulation function.

17. The non-transitory storage medium of claim 15, wherein training the radial basis function network based on the image to be reconstructed and the sample image further comprises:

initializing a plurality of structural parameters and a loss function of the radial basis function network.

18. The non-transitory storage medium of claim 17, wherein training the radial basis function network based on the image to be reconstructed and the sample image further comprises:

optimizing the plurality of structural parameters until the loss function corresponding to an output result of the radial basis function network converges to a preset value by using the sample image as input data of the radial basis function network.

19. The non-transitory storage medium of claim 17, wherein the method further comprises:

optimizing the radial basis function network using an optimization algorithm provided with a gradient descent algorithm.

20. The non-transitory storage medium of claim 15, wherein the method further comprises:

simulating point spread function models corresponding to the target camera device by invoking the radial basis function network.

* * * * *